United States Patent
Spriggel

(10) Patent No.: US 11,879,494 B1
(45) Date of Patent: Jan. 23, 2024

(54) LOCKNUT WITH U-SHAPED SPRING MEMBER

(71) Applicant: Daniel John Spriggel, Henderson, NV (US)

(72) Inventor: Daniel John Spriggel, Henderson, NV (US)

( * ) Notice: Subject to any disclaimer, the term of this patent is extended or adjusted under 35 U.S.C. 154(b) by 163 days.

(21) Appl. No.: 17/300,652

(22) Filed: Sep. 13, 2021

(51) Int. Cl.
*F16B 39/34* (2006.01)

(52) U.S. Cl.
CPC .................... *F16B 39/34* (2013.01)

(58) Field of Classification Search
CPC .. F16B 39/34; F16B 37/0871; F16B 37/0878; F16B 37/0892
USPC ........ 411/302, 304, 246, 247, 250, 254, 256
See application file for complete search history.

(56) References Cited

U.S. PATENT DOCUMENTS

| | | | | |
|---|---|---|---|---|
| 298,843 A | * | 5/1884 | Gissinger | F16B 39/34 411/304 |
| 1,957,095 A | * | 5/1934 | Cole | F16B 39/34 411/262 |
| 3,844,518 A | * | 10/1974 | Long | A47L 15/4253 248/188.4 |
| 4,248,285 A | * | 2/1981 | Flaig | F16B 39/34 411/222 |
| 4,634,327 A | * | 1/1987 | Kowalski | F16B 37/0814 411/432 |
| 4,790,229 A | * | 12/1988 | Hoshino | F16B 41/002 984/151 |
| 5,098,241 A | * | 3/1992 | Aldridge | F16L 37/092 285/321 |
| 5,208,412 A | * | 5/1993 | Hoshino | G10D 13/16 84/411 R |
| 5,894,641 A | * | 4/1999 | Hurtz | A44B 17/0011 24/658 |
| 6,050,766 A | * | 4/2000 | Kies | F16B 37/0892 411/522 |

* cited by examiner

*Primary Examiner* — Flemming Saether
(74) *Attorney, Agent, or Firm* — Jack C. Munro

(57) ABSTRACT

A locknut which uses a U-shaped spring member that is mounted in a nut body that applies frictional pressure onto a threaded member that engages with said nut body.

6 Claims, 5 Drawing Sheets

LOCKNUT WITH U-SHAPED SPRING MEMBER

Bolts that connect with a nut have been in common use for many years. Frequently the bolt installation is in a machinery environment where the machine is operated by an energy source such as gas or electricity. The machine inherently produces vibration and/or thermal expansion/contraction. This vibration and/or thermal expansion/contraction causes the nut to loosen on the bolt even though it has been tightly installed. This loosening can cause the nut to separate from the bolt which could result in the member that was being held onto the machine to disengage. This disengagement can be dangerous and could cause the machine to fail which could result in injury or death to the human operator.

Another environment where loose nuts can be dangerous is wheel nuts that are used to attach wheels on vehicles. It is said that in the United States that there are multiple vehicle accidents each month due to loose wheel nuts. Obviously in the world that number will be much greater.

To overcome loosening nuts it has been common to use a locknut. There are literally hundreds of different types of locknuts all of which require the tight installation by a separate tool such as a wrench and the use of the same tool to disengage the locknut if disengagement is desired. Some locknuts are destroyed when removed thereby requiring a new locknut to be installed. It would be desirable to permit the locknut to be removable and reinstallable.

The manufacturing cost of most prior art locknuts is substantially greater than conventional non-locking nuts. This increased cost prevents their usage in some environments and especially where a large volume of nuts are to be made. The cost of the locknut of this invention is only about a penny greater than conventional non-locking nuts which does not limit its usage when manufacturing a large volume of nuts.

SUMMARY OF THE INVENTION

A metallic nut body has a longitudinal threaded through opening into which a threaded member, such as a screw, bolt or stud, is to be inserted and engaged with the threads of the through opening. The nut body includes a pocket that connects with the through opening. An access opening is formed in the side wall of the nut body. The access opening provides access to the pocket. A bifurcated U-shaped spring member is to be inserted through the access opening into the pocket. The U-shaped spring member has a pair of spaced apart leg members (which forms the bifurcation) each of which is slightly bowed toward each other providing the spring action. These bowed leg members are to apply a frictional pressure onto the threaded member preventing unauthorized unthreading and disengagement of the threaded member from the nut body. In the first embodiment of locknut of this invention each leg member terminates in an enlarged end member that contacts the threaded member to prevent longitudinal movement of the threaded member relative to the nut body. The leg members of the first embodiment are constructed flat where in the second and third embodiments the leg members are circular. The leg members in the first embodiment are to press against two, three of four crests of the grooves in the threaded member. In the second embodiment each leg member is to rest within a groove of the threaded member which is located between a pair of crests. The third embodiment comprises a stacked series of second embodiments.

DETAILED DESCRIPTION OF THE INVENTION

Figure 1:
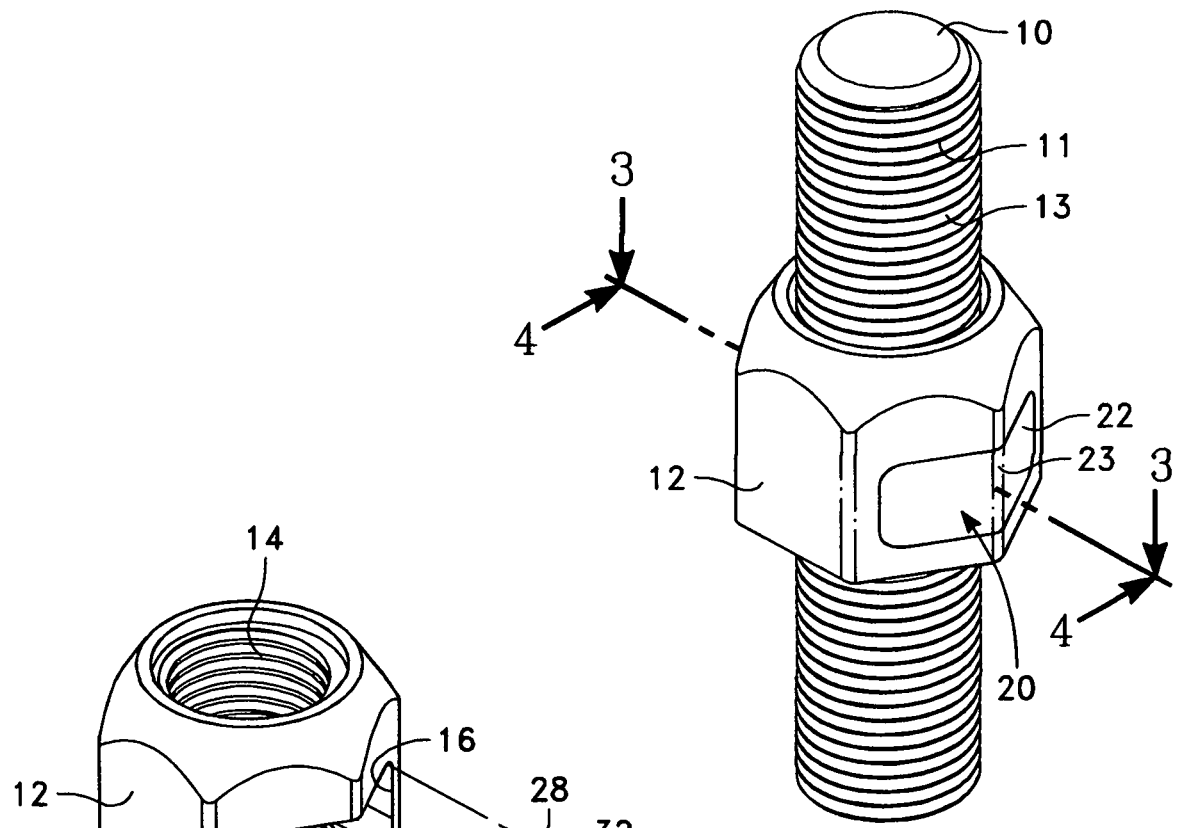
FIG. 1 is an exterior isometric view of the locknut of this invention mounted on a nut which is mounted on a stud.

Referring specifically to the drawings there is shown a cylindrical threaded member 10 in the form of a stud. However the member 10 could comprise a screw or a bolt. Studs are in common use for mounting vehicle tire rims (not shown) onto vehicles (not shown) such as automobiles and buses. The threaded member 10 has a series of helical threads where each thread is defined by a pair of spaced apart circular crests 11 and a circular groove 13 located therebetween. The helical threads are slanted slightly relative to the longitudinal center axis 15 of the threaded member 10 which means the crests 11 and groove 13 are really not circular but are close. This slanting can vary but usually is 2, 3 or 4 degrees.

A nut 12 has a central threaded through opening 14 within which the member 10 is to be located. When the member 10 is located at its desired position on the nut 12, it is desired to fix this position preventing unauthorized disengagement. For this purpose the following is utilized.

Nut 12 has an access opening 16 formed in its sidewall. This access opening 16 connects to a pocket 18 which connects to threaded opening 14. A spring member 20 (first embodiment) is to be inserted through access opening 16 and located in a close fitting manner within pocket 18. Spring member 20 has an apex portion 22 which is to be flush with the exterior sidewall of nut 12. Spring member 20 is to be constructed of metal such as stainless steel. Extending from the right side of apex portion 22 and located substantially perpendicular thereto is a right leg member 24. Extending from the left side of apex portion 22 and located substantially perpendicular thereto is a left leg member 26. Left leg member 26 is positioned parallel to right leg member 24. Both leg members 24 and 26 are constructed to have slight inward bowing. Both leg members 24 and 26 are in the form of a flat plate. Apex portion 22 is also flat but has a bend at its center 23. When the spring member 20 is installed in the pocket 18 the apex portion 22 is flush with a pair of joined chamfered surfaces of the nut 12.

The outer end of leg member 24 has attached thereto an end member 28. The outer end of leg member 26 has attached thereto an end member 30. The end members 28 and 30 are located at 90 degrees relative to their leg members 24 and 26. The end members 28 and 30 face each other. The leg members 24 and 26 are narrower than apex portion 22, The height of each of the end members 28 and 30 is the same and is equal to the height of the apex portion 22. When the spring member 20 is inserted into pocket 18 the end members 28 and 30 contact the upper wall and the bottom wall of the pocket 18 preventing any tilting of the leg members 24 and 26 keeping the spring member 22 in a perpendicular relationship relative to the longitudinal center axis 15 thereby eliminating any sloppy movement of the spring member 22. The use of end members 28 and 30 is required because the leg members 24 and 26 rest on the crests of some grooves of the threaded member 10 and are not restrained in any manner except for the end members 28 and 30.

Figure 2:
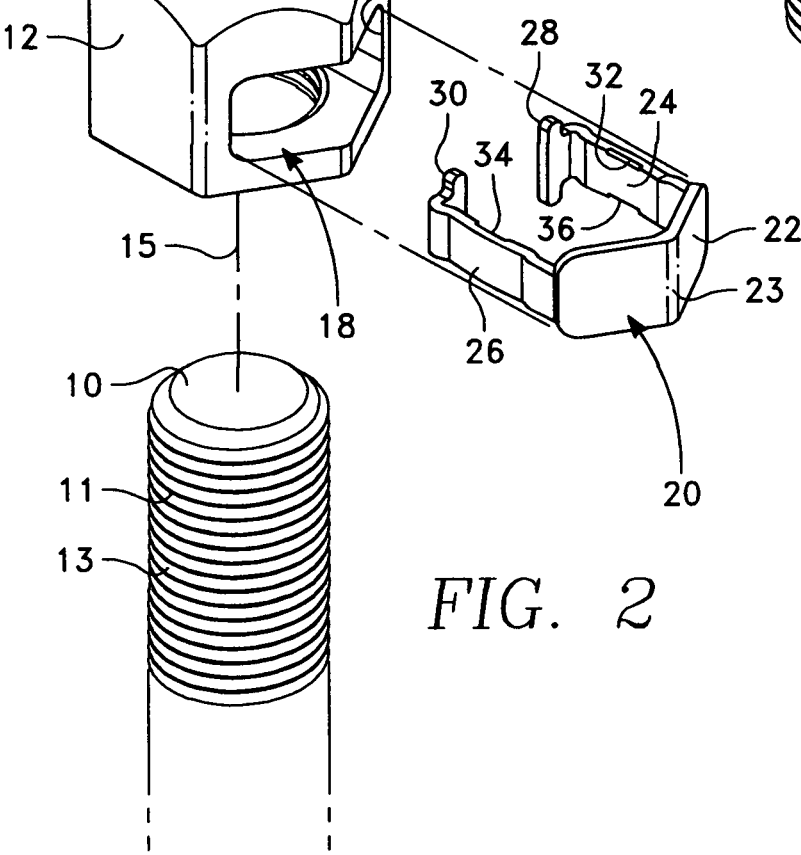
FIG. 2 is an exploded isometric view showing the locknut disassembled from the nut.
Figure 3:
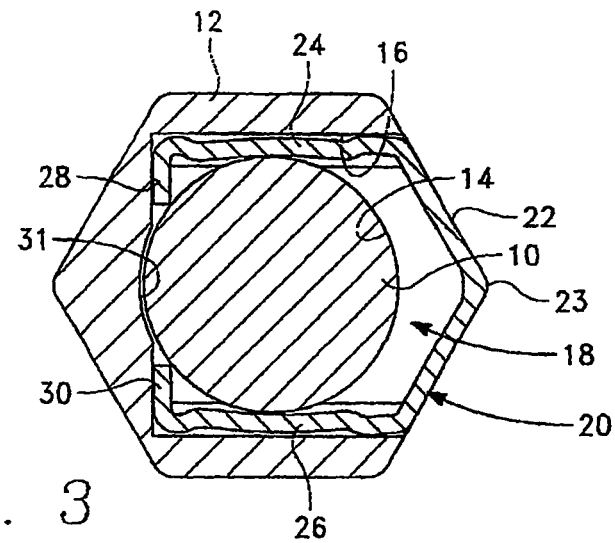
FIG. 3 is a cross sectional view taken along line 3-3 of FIG. 1.
Figure 4:
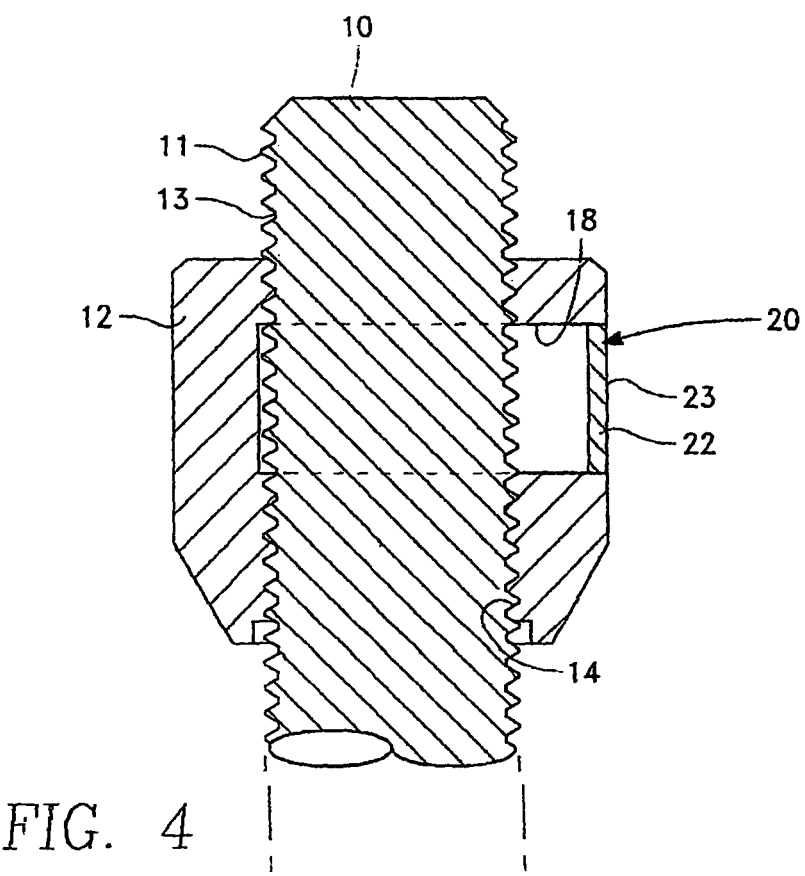
FIG. 4 is a cross sectional view taken along line 4-4 of FIG. 1.

How the spring member 20 gets its spring action is as follows. The spring member 20 is U-shaped. When the spring member 20 is inserted into the pocket 18 the threaded member 10 is then engaged with the through opening 14. The spring member 20 can be inserted either right side up or upside down. The threaded member 10 is slipped over a bevel 32 formed on the upper edge of the inner surface of leg member 24 and at the same time is slipped over bevel 34 formed on the upper edge of the inner surface of leg member 26. These bevels 32 and 34 facilitate the insertion of the threaded member 10. If the spring member 20 is inserted upside down there are bevels also on the lower edge of the inside surfaces of leg members 24 and 26 with only bevel 36 being shown for leg member 24 in FIG. 2 of the drawings. The threaded member 10 causes both leg members 24 and 26 to deflect outwardly decreasing the bowing producing a force pressing on the threaded member 10, hence spring action. By having two leg members 24 and 26 they can work together to press on the threaded member 10. The back surface of pocket 18 is deformed forming a cutout 31 which is required to provide clearance for the threaded member 10.

Figure 5:
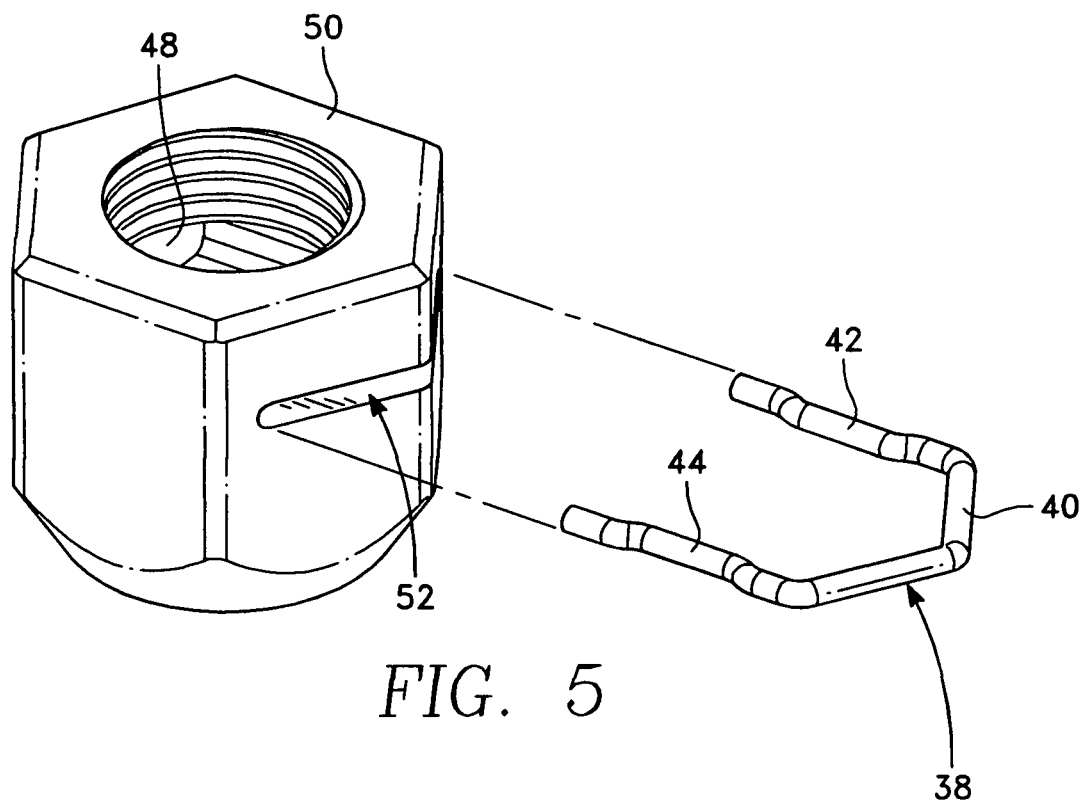
FIG. 5 is an isometric view of the second embodiment of this invention depicting the interconnection with the body of the nut.
Figure 6:
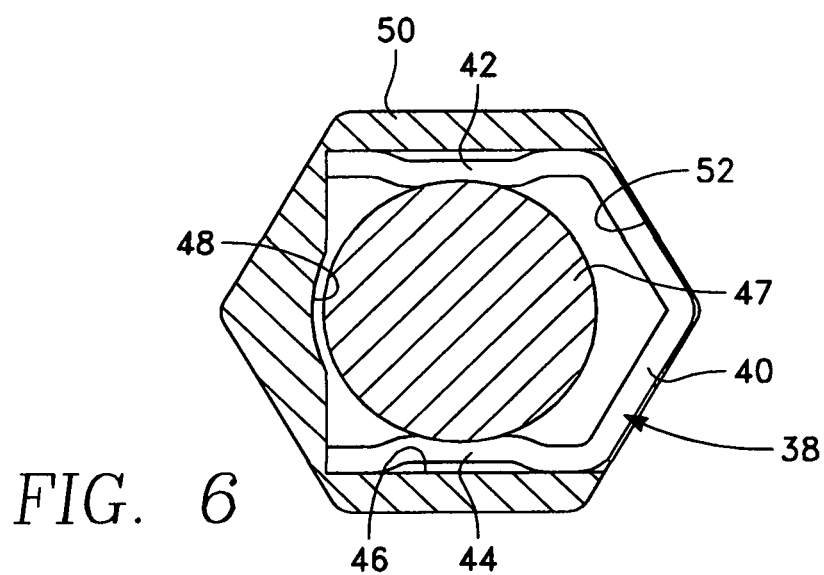
FIG. 6 is a transverse cross sectional view showing the installation of the second embodiment of the invention with the nut.

The previous discussion pertains mostly to the first embodiment of this invention shown in FIGS. 1-4. There is a second embodiment shown in FIGS. 5 and 6. The U-shaped spring member 38 is in the form of a tube. This tube has an apex portion 40 which is connected between leg members 42 and 44. The leg members 42 and 44 are bowed inwardly as is clearly shown in FIG. 5. The diameter of the tube is selected so the tube will rest within a groove of the threaded member 47 shown in FIG. 6. The tube can be solid or hollow. There is no need for end members 28 and 30 that are used in FIGS. 1-4 as the flanks of the groove of the threaded member 46 restrain the spring member 38 and keep it from moving longitudinally. The spring action is achieved in the same way by the threaded member applying pressure against the bowed leg members 42 and 44. The back wall of the pocket 46 includes a cutout 48 which is identical to cutout 31. The cutout 48 is formed in nut 50. The spring member 38 in inserted though access opening 52 into pocket 46. The transverse dimension of access opening is slanted to coincide with the amount of helical offset of the threads located on the threaded member 47. This slanting is necessary so the spring member will fall within a single groove of the threaded member 47.

Figure 7:
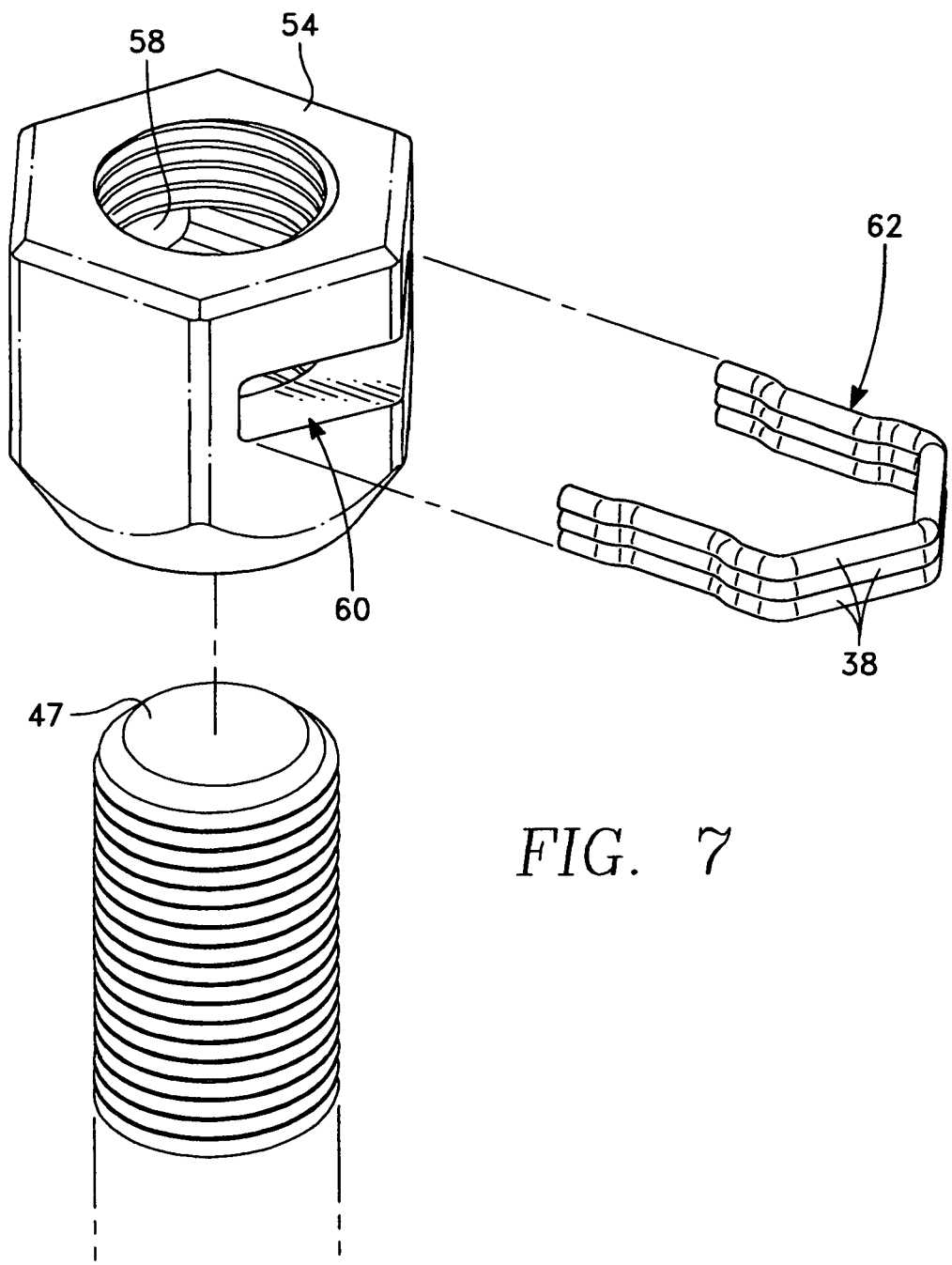
FIG. 7 is an isometric view of the third embodiment of this invention showing a stacked series of second embodiments disengaged from the nut and the threaded member also not engaged with the nut.
Figure 8:
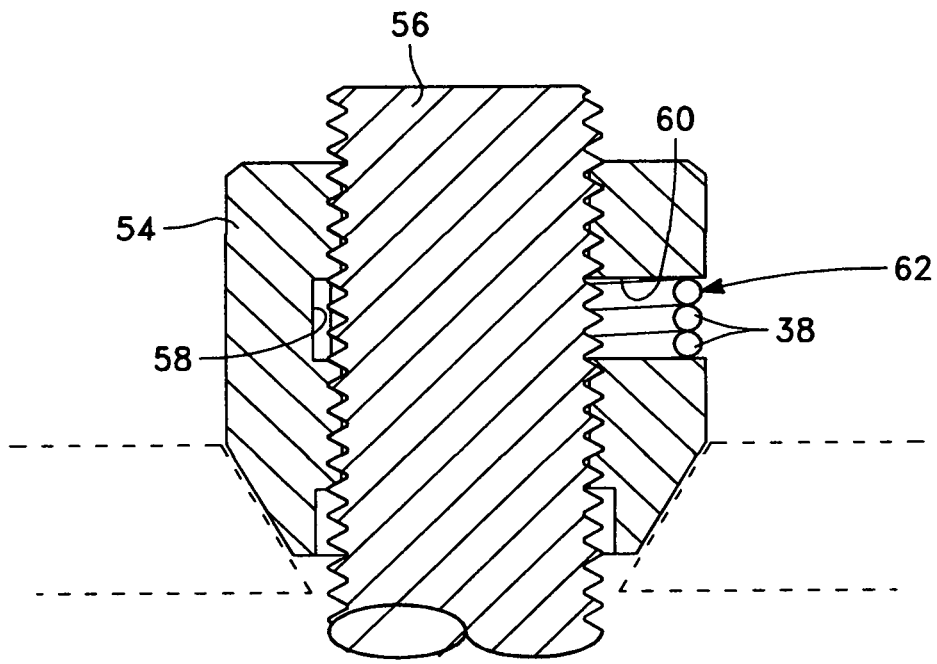
FIG. 8 is a longitudinal cross sectional view of the third embodiment showing the third embodiment installed with the nut.
Figure 9:
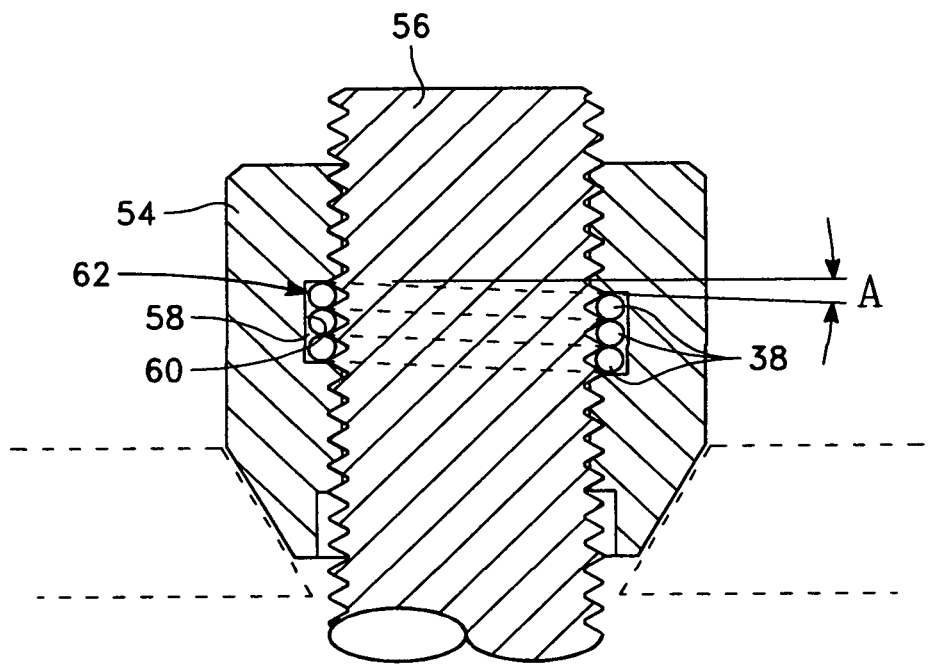
FIG. 9 is a view similar to FIG. 8 but where the cross section is taken at 90 degrees displaced from FIG. 8 and where the nut body is cut away to show how the stacked series of spring members connect with the threaded member.

Referring to FIGS. 7-9 there is shown the third embodiment of locknut of this invention. Nut 54 is threaded on threaded member. Nut 54 includes a pocket 58 and an access opening 60 that provides access to pocket 58. As shown in FIG. 9 access opening 60 is slightly slanted with the amount of slanting equal to the helical angle of the threads of the threaded member 56. The amount of slanting is shown as distance A in FIG. 9. The spring member 62 is composed of a plurality (3 in number shown but could be any number) of spring member tubes 38 mounted in a stacked relationship. Each tube 38 will be located in a separate groove of the threads of threaded member 56. The locking force of the third embodiment is much greater than in the second embodiment and likely will be used in highly vibrational environment.

The invention claimed is:

1. A locknut comprising:
    a nut body having a through opening which is threaded so it can engage with a threaded member, said nut body having an enclosing sidewall, an access opening formed in said sidewall providing access to a pocket which connects with said through opening;
    a U-shaped spring member that is slid into said pocket through said access opening, whereby when said nut body engages with said threaded member said spring member presses against said threaded member preventing unauthorized disengagement of said threaded member from said nut body, said spring member being constructed of metal; and
    said U-shaped spring member including a pair of spaced apart leg members, said leg members being bowed toward each other, said threaded member pressing against said leg members slightly decreasing the amount of bowing.

2. The locknut as defined in claim 1 wherein:
    each said leg member being connected at its outer end to an end member with there being two separate end members facing each other.

3. The locknut as defined in claim 2 wherein:
    each said end member having a width greater than its connected said leg member.

4. The locknut as defined in claim 1 wherein:
    each said leg member having an inside surface, each said leg member having an upper edge and a lower edge, each said upper edge includes a bevel that facilitates insertion of said threaded member into said nut body.

5. The locknut as defined in claim 4 wherein:
    each said lower edge also includes a bevel.

6. The locknut as defined ion claim 1 wherein:
    said leg members formed in a flat plate.

* * * * *